March 19, 1935.  I. C. KLINGLER  1,994,522
TOOL HANDLE
Filed April 27, 1934
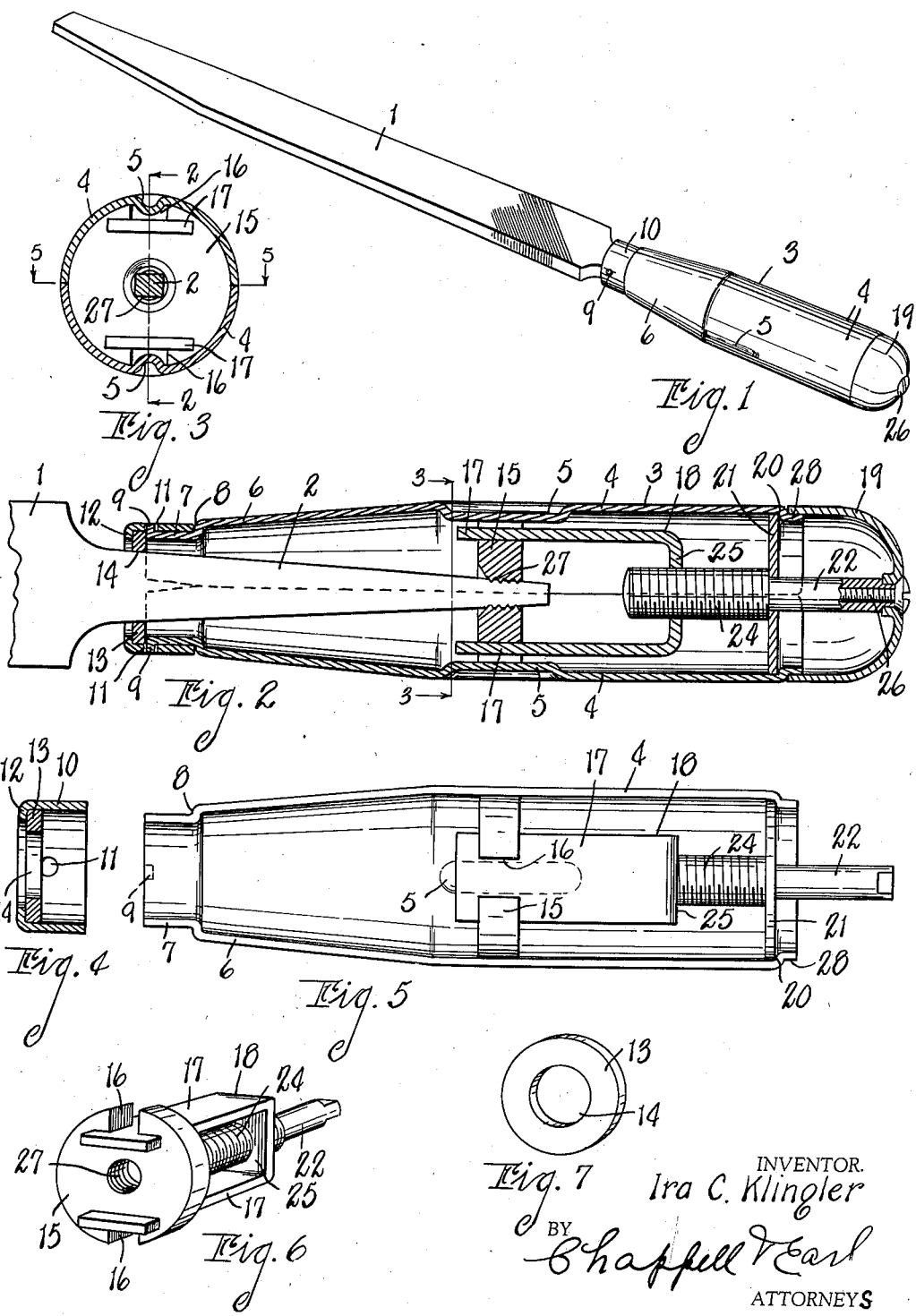
INVENTOR.
Ira C. Klingler
BY
Chappell & Earl
ATTORNEYS Patented Mar. 19, 1935

1,994,522

UNITED STATES PATENT OFFICE 1,994,522

TOOL HANDLE

Ira C. Klingler, Elkhart, Ind.

Application April 27, 1934, Serial No. 722,641

17 Claims. (Cl. 29—80)

The main objects of this invention are:

First, to provide a detachable handle for implements or tools such as files, chisels, routers, knives and the like having handle receiving shanks or tangs.

Second, to provide a detachable handle which very securely engages the shank or tang of the implement and without previous preparation or special forming of the shank or tang.

Third, to provide a handle having these advantages which has a considerable range or adaptability in the matter of size of the implements or their tangs.

Fourth, to provide a detachable handle having these advantages which is simple and economical to produce and may be very quickly and easily applied to or detached from the implement.

Objects relating to details and economies of my invention will appear from the description to follow. The invention is defined and pointed out in the claims.

A structure which is a preferred embodiment of my invention is illustrated in the accompanying drawing, in which:

Fig. 1 is a perspective view of a handle embodying the features of my invention associated with a file.

Fig. 2 is an enlarged fragmentary view mainly in longitudinal section on line 2—2 of Fig. 3.

Fig. 3 is a transverse section on line 3—3 of Fig. 2.

Fig 4 is a longitudinal section of the handle ferrule and the chuck collar at the inner end of the handle.

Fig. 5 is a fragmentary view partially on line 5—5 of Fig. 3.

Fig. 6 is a perspective view of the chuck assembly.

Fig. 7 is a perspective view of the chuck collar.

In the embodiment of my invention illustrated, numeral 1 indicates a rasp or file having a tapered tang or shank 2. In tools or implements of this general type, the shanks or tangs are not usually hardened sufficiently to prevent the ready cutting of threads on the chuck jaw engaging teeth.

My handle designated generally by the numeral 3 illustrated is especially designed for tools or implements provided with tangs adapted to receive a handle, a file being illustrated and referred to in the description merely by way of example.

The handle 3 in the embodiment illustrated is formed of a pair of semi-cylindrical complementary members 4 having their walls conformed to provide opposed internal longitudinal ribs 5, a conical inner or tip part 6 and a reduced inner end portion 7. This reduced portion has a reduced portion 8 at its inner end and oppositely projecting lateral lugs 9 at its outer end. The handle members assembled constitute a hollow or chambered body suitable for gripping and they are preferably formed as stampings.

On the reduced portion 7 of the body, I mount a ferrule or handle collar 10 which receives these reduced ends and holds them in assembled relation. The ferrule is provided with openings 11 receiving the lugs 9.

The ferrule has an inturned flange 12 spaced from the end of the shell to provide a seat for the chuck collar 13 which is preferably made of hardened steel, its opening 14 being adapted to receive the tapered shank 2 of an implement, as 1. Each handle may be and is preferably provided with several chuck collars of this character having different sized shank or tang receiving openings, thereby increasing the range of the handle. If desired, the openings of the collar may be formed with splines or teeth for engaging the tool implement shank.

Within the handle, I dispose a chuck jaw 15 having a central internally threaded opening adapted for forming screw threads or co-engaging teeth on the face of the implement, as illustrated. The chuck jaw has opposed recesses or slots 16 coacting with the ribs 5 of the handle body to secure the jaw against rotative movement within the body but to permit axial movement of the jaw within the body.

The arms 17 of the yoke 18 terminate in T-connections or have opposed slots resulting in a T-head engaging the slots in the chuck jaw.

The body members 4 are conformed at their outer ends to provide the reduced annular portion 28 on which the cap 19 is rotatably mounted, the cap embracing this reduced portion and coacting with the ferrule in holding the body sections in assembled relation. This conformation of the rear end of the body sections provides an internal shoulder 20 against which is seated the disk-like bearing member 21. A spindle 22 is journaled in this bearing member and has a screw 24 threaded to the web or bight portion 25 of the yoke for adjusting the chuck jaw axially within the handle when the spindle is rotated. Between the cap 19 and the spindle, I provide a D-connection so that the spindle may be rotated by rotation of the cap, the parts being held in assembled relation by means of the screw 26 tapered longitudinally of the spindle.

With the parts thus arranged, the chuck jaw 15 is advanced to its forward position by rotation of the cap 19. The tang of the implement to which the handle is to be applied is then inserted into the handle and the handle and tool relatively rotated in thread or tooth cutting direction so as to form screw threads or teeth on the implement tang and to provide a secure clutching engagement of the chuck jaw and tool. The cap 19 is then turned which draws or retracts the jaw and securely wedges the tapered shank or tang of the implement into the chuck collar 13 with a result that the handle is very securely attached and there is no relative movement between the handle and the implement. The handle may be released by turning the cap or adjusting member 19 so as to advance the chuck jaw within the handle and along with it the tool shank or tang, this freeing the same from the clutch collar and permitting the handle to be rotated to unscrew the chuck jaw from the tang.

Owing to the relation of the parts, a single handle has a considerable range of adaptability to tools having a plurality of shanks of different sizes. This range may be increased by providing chuck collars having openings 14 of different diameters. Inasmuch as the handles can be readily assembled and disassembled merely by removing the screw 26, this interchange may be readily accomplished. However, it is not intended that a single handle should in this manner be made universal as different sized handles within certain ranges are desirable because of the resulting advantage of "feel" or balance of the tool; that is, an excessively large or heavy handle on a small tool is not a thing to be desired by a skilled workman.

My improved handle results in a very secure connection to the tool or implement and one which it is practically impossible to become loosened or to slip off a tool as is likely to occur with the type of handles commonly used and which may result in serious injury to the operator or user, this having been quite a common occurrence.

I have illustrated and described my improvements in an embodiment which I consider very desirable. I have not illustrated various modifications and adaptations contemplated by me as it is believed that this disclosure will enable those skilled in the art to embody or adapt the same as may be desired.

Having thus described my invention, what I claim as new and desire to secure by Letters Patent, is:

1. A tool handle comprising in combination a hollow cylindrical shell consisting of a pair of opposed semi-cylindrical complementary members having their walls conformed to provide longitudinal internal ribs and a conical tip terminating in a reduced portion having a shoulder at its inner end and oppositely projecting lateral lugs at its outer end, a handle collar or ferrule embracing said reduced end portion for holding said shell members in assembled relation and having opposed openings receiving said lugs, the ferrule having an inturned flange spaced from the end of said shell, a chuck collar disposed in said ferrule between said flange and the end of the shell for receiving the tapered shank of a tool, an internally threaded chuck jaw adapted for forming threads on a tool shank and having opposed recesses coacting with said ribs to guide the movement of said jaw axially of the shell, a cap rotatably mounted on the outer end of said shell and embracing said shell members for holding them in assembled relation, and means controlled by said cap for axially moving said jaw in response to the turning of said cap.

2. A tool handle comprising in combination a hollow cylindrical shell conformed to provide longitudinal internal ribs and terminating in a reduced portion having oppositely projecting lateral lugs at its outer end, a handle collar or ferrule embracing said reduced end portion and having opposed openings receiving said lugs, the ferrule having an inturned flange spaced from the end of said shell, a chuck collar disposed in said ferrule between said flange and the end of the shell for receiving the tapered shank of a tool, an internally threaded chuck jaw adapted for forming threads on a tool shank and having opposed recesses coacting with said ribs to guide the movement of said jaw axially of the shell, a cap rotatably mounted on the outer end of said shell, and means controlled by said cap for axially moving said jaw in response to the turning of said cap.

3. A detachable handle comprising in combination a hollow cylindrical shell conformed to provide longitudinal internal ribs, a ferrule embracing one end of said shell and having an inturned flange spaced from the end of said shell, a chuck collar disposed in said ferrule between said flange and the end of the shell for receiving the tapered shank of a tool, a toothed chuck jaw adapted for forming cutting engagement on a tool shank and having opposed recesses coacting with said ribs to guide the movement of said jaw axially of the shell, a cap rotatably mounted on the outer end of said shell, and means controlled by said cap for axially moving said jaw in response to the turning of said cap.

4. A detachable handle comprising in combination a hollow cylindrical shell conformed to provide longitudinal internal ribs, a ferrule embracing one end of said shell and having an inturned flange spaced from the end of said shell, a chuck collar disposed in said ferrule between said flange and the end of the shell for receiving the tapered shank of a tool, a toothed chuck jaw adapted for forming cutting engagement on a tool shank and having opposed recesses coacting with said ribs to guide the movement of said jaw axially of the shell, and means for axially moving said jaw.

5. A handle for tools or the like comprising in combination a hollow cylindrical body having a chuck collar at one end adapted to receive the tapered shank of a tool, a chuck jaw splined within said body for rotation therewith and adapted to receive and to form co-engaging teeth on a tool shank, a bearing member mounted in the other end of said body, a yoke having its arms connected to said chuck jaw, a spindle journaled in said bearing member and having a screw threaded to said yoke for moving said jaw axially of said body when said spindle is rotated, and a cap rotatable on the end of said body and connected to said spindle for rotating the same.

6. A handle for tools or the like comprising in combination a tubular body having a chuck collar at one end, a chuck jaw splined within said shell for rotation therewith and adapted to receive and to cut coacting teeth on a tool shank, a yoke having its arms connected to said chuck jaw, a spindle journaled in the other end of said body and having a screw threaded to said yoke for moving said jaw axially of said body when said spindle is rotated, and means rotatable on said body and connected to said spindle for rotating the same.

7. A detachable handle comprising a tubular body consisting of a pair of opposed cylindrical complementary members terminating in a reduced portion at their inner ends and having outwardly projecting lugs, a ferrule embracing said reduced end portion for holding said body members in assembled relation and having opposed openings to receive said lugs, the ferrule having an inturned flange spaced from the end of said body, a chuck collar disposed in said ferrule between said flange and the end of the body, a toothed chuck jaw mounted for axial movement within said body, a cap embracing and rotatably mounted on the outer end of said body members and constituting means for holding them in assembled relation, a disk arranged within said body members at their outer ends, and a shouldered spindle having threaded connection with said jaw member and engaging said disk, said spindle being detachably secured to said cap whereby the spindle may be rotated through said cap and the cap is retained in assembled relation with said body members.

8. A detachable handle comprising a tubular body consisting of a pair of opposed cylindrical complementary members having outwardly projecting lugs at their inner ends, a ferrule embracing the inner ends of said body members for holding them in assembled relation and having opposed openings to receive said lugs, a toothed chuck jaw mounted for axial movement within said body, a cap embracing and rotatably mounted on the outer end of said body members and constituting means for holding them in assembled relation, a disk arranged within said body members at their outer ends, and a shouldered spindle having threaded connection with said jaw member and engaging said disk, said spindle being detachably secured to said cap whereby the spindle may be rotated through said cap and the cap is retained in assembled relation with said body members.

9. A detachable handle comprising a tubular body consisting of a pair of opposed cylindrical complementary members, means at the inner ends of said body members for holding them in assembled relation, a chuck jaw mounted for axial movement within said body and adapted for forming coacting jaw engaging teeth on a tool shank, a cap embracing and rotatably mounted on the outer end of said body members and constituting means for holding them in assembled relation, and a spindle having threaded connection with said jaw member and detachably secured to said cap whereby the spindle may be rotated through said cap and the cap is retained in assembled relation with said body members.

10. A tool handle comprising in combination a hollow shell having an open end adapted to receive the tapered shank of a tool, a chuck jaw axially and non-rotatably mounted in said shell and adapted for cutting threads on the tool shank when the shell is rotated relative to the tool, and means including a rotatable closure cap on the outer end of said shell for controlling the axial position of said jaw to clamp or release the tool within the open end of the shell.

11. A tool handle comprising in combination a hollow shell having an open end adapted to receive the tapered shank of a tool, a chuck jaw axially and non-rotatably mounted in said shell and adapted for cutting threads on the tool shank when the shell is rotated relative to the tool, and means for controlling the axial position of said jaw to clamp or release the same within the open end of the shell.

12. A tool handle comprising in combination a hollow shell having an open end adapted to receive the tapered shank of a tool, a toothed chuck jaw axially and non-rotatably mounted in said shell and adapted for cutting coacting teeth on the tool shank when the shell is rotated relative to the tool, and means rotatable on said shell for controlling the axial position of said jaw to clamp or release the tool within the open end of the shell.

13. A handle comprising in combination a hollow body adapted to receive the shank or tang of an implement, a chuck jaw axially and non-rotatably mounted in said body and adapted for cutting threads on an implement shank or tang when the body is rotated relative to the implement, and means for adjusting said jaw axially within said body.

14. A tool handle comprising in combination a hollow cylindrical shell consisting of a pair of opposed semi-cylindrical complementary members having their walls conformed to provide a conical tip terminating in a reduced portion having a shoulder at its inner end and oppositely projecting lateral lugs at its outer end, a ferrule embracing said reduced end portion for holding said shell members in assembled relation and having opposed openings receiving said lugs, the ferrule having an inturned flange spaced from the end of said shell, a chuck collar disposed in said ferrule between said flange and the end of the shell, a chuck jaw movable axially of the shell, a cap rotatably mounted on the outer end of said shell and embracing said shell members for holding them in assembled relation, and means controlled by said cap for axially moving said jaw in response to the turning of said cap.

15. A detachable handle comprising a tubular body consisting of a plurality of cylindrical complementary members, means at the inner ends of said body members for holding them in assembled relation, a chuck jaw mounted within said body, a cap embracing and rotatably mounted on the outer end of said body members and constituting means for holding them in assembled relation, and a spindle having threaded connection with said jaw member and secured to said cap whereby the spindle may be rotated through said cap and the cap is retained in assembled relation with said body members.

16. A tool handle comprising a tubular shell consisting of a plurality of longitudinally jointed sections, a ferrule embracing said shell at one end, a cap embracing said shell at the other end, means acting to hold said cap on said shell for rotary movement relative thereto, and tool shank engaging means within the shell controlled by the rotary movement of the cap, the ferrule and cap acting to hold the shell sections in assembled relation.

17. A tool handle comprising a tubular shell consisting of a plurality of longitudinal jointed sections, means acting to hold said shell sections in assembled relation at one end of the shell, tool shank engaging means within said shell, and means for controlling said tool shank engaging means, said controlling means also acting to hold said shell sections in assembled relation at the other end of the shell.

IRA C. KLINGLER.